United States Patent
Gomez et al.

(10) Patent No.: US 11,122,112 B1
(45) Date of Patent: Sep. 14, 2021

(54) SYSTEMS AND METHODS FOR DISTRIBUTED MICRO SERVICES USING PRIVATE AND EXTERNAL NETWORKS

(71) Applicant: JPMorgan Chase Bank, N.A., New York, NY (US)

(72) Inventors: Erick A. Gomez, Cypress, TX (US); Bret Goldsmith, Sugar Land, TX (US); Gordon Robert Macdonald, Brooklyn, NY (US); Harshavardhan Reddy Mukkera, Sugar Land, TX (US); Hirenkumar Patel, Sugar Land, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 180 days.

(21) Appl. No.: 15/274,130

(22) Filed: Sep. 23, 2016

(51) Int. Cl.
*G06F 15/173* (2006.01)
*H04L 29/08* (2006.01)
*G06F 16/951* (2019.01)
*G06F 15/16* (2006.01)

(52) U.S. Cl.
CPC ............ *H04L 67/10* (2013.01); *G06F 16/951* (2019.01); *H04L 67/18* (2013.01); *H04L 67/327* (2013.01)

(58) Field of Classification Search
CPC ....... H04L 67/10; H04L 67/18; H04L 67/327; G06F 16/951
USPC .......................................................... 709/224
See application file for complete search history.

(56) References Cited

U.S. PATENT DOCUMENTS

| | | | |
|---|---|---|---|
| 9,661,071 B2* | 5/2017 | Manglik | H04L 67/2823 |
| 2009/0055749 A1* | 2/2009 | Chatterjee | G06F 3/04817 715/738 |
| 2009/0132543 A1* | 5/2009 | Chatley | G06F 3/0613 |
| 2014/0372533 A1* | 12/2014 | Fu | H04L 67/10 709/204 |
| 2015/0263894 A1* | 9/2015 | Kasturi | H04L 41/0806 709/222 |
| 2016/0105488 A1* | 4/2016 | Thakkar | H04L 67/10 709/217 |
| 2016/0241596 A1* | 8/2016 | Overby, Jr. | H04L 63/20 |
| 2017/0192825 A1* | 7/2017 | Biberman | G06F 9/5072 |
| 2017/0257432 A1* | 9/2017 | Fu | G06F 9/5072 |
| 2017/0374174 A1* | 12/2017 | Evens | H04L 67/10 |
| 2018/0083835 A1* | 3/2018 | Cole | H04L 41/0866 |
| 2018/0300124 A1* | 10/2018 | Malladi | H04L 29/08 |
| 2019/0327135 A1* | 10/2019 | Johnson | H04L 67/34 |

\* cited by examiner

*Primary Examiner* — Karen C Tang
(74) *Attorney, Agent, or Firm* — Hunton Andrews Kurth LLP

(57) ABSTRACT

Systems and methods for enhanced organizational transparency using a credit chain are disclosed. In one embodiment, a method for accessing a resource may include (1) a cloud foundry comprising at least one computer processor receiving an application request from an interface provided by an end user electronic device; (2) the cloud foundry determining a location of at least one resource associated with the application request, wherein the location is selected from a private cloud and a public cloud; (3) the cloud foundry retrieving at least one of a microservice and an API necessary to access the resource from the location; and (4) the cloud foundry routing the application request to the location using the at least one of the microservice and the API.

16 Claims, 2 Drawing Sheets

SYSTEMS AND METHODS FOR DISTRIBUTED MICRO SERVICES USING PRIVATE AND EXTERNAL NETWORKS

BACKGROUND OF THE INVENTION

1. Field of the Invention

The present disclosure generally relates to systems and methods for distributed micro services using private and external networks.

2. Description of the Related Art

Cloud computing is attractive due to is seemingly unlimited storage and its ability to provide services and data to geographically dispersed members of an organization. Cloud computing may, however, present security risks to organizations for which security is important.

SUMMARY OF THE INVENTION

Systems and methods for enhanced organizational transparency using a credit chain are disclosed. In one embodiment, a method for accessing a resource may include (1) a cloud foundry comprising at least one computer processor receiving an application request from an interface provided by an end user electronic device; (2) the cloud foundry determining a location of at least one resource associated with the application request, wherein the location is selected from a private cloud and a public cloud; (3) the cloud foundry retrieving at least one of a microservice and an API necessary to access the resource from the location; and (4) the cloud foundry routing the application request to the location using the at least one of the microservice and the API.

In one embodiment, the cloud foundry may determine the location based on a prior application request for the at least one resource, on a security requirement associated with the at least one resource, on a type of the at least one resource, etc. In one embodiment, the location of the at least one resource may be stored in a database, and the cloud foundry may access the database to retrieve the location.

In one embodiment, the microservice and the/or the API may be stored in a library.

In one embodiment, the method may further include the cloud foundry verifying an entitlement of a user associated with the electronic device.

In one embodiment, the microservices may include a REST API a SOAP API, etc.

In one embodiment, the method may further include the cloud foundry routing the resource to the end user electronic device.

In one embodiment, the resource may be an application, data, etc.

According to another embodiment, a system for accessing a resource may include an end user electronic device; a cloud foundry in communication with the end user electronic device; a microservices API library hosting a plurality of microservices; at least one public cloud hosting at least one public resource; and at least one private cloud hosting at least one private resource. In one embodiment, the cloud foundry may receive an application request from an interface provided by the end user electronic device; the cloud foundry may determine a location of at least one resource associated with the application request, wherein the location is selected from the private cloud and the public cloud; the cloud foundry may retrieve, from the microservices API library, at least one of a microservice and an API necessary to access the resource from the location; and the cloud foundry may route the application request to the location using the at least one of the microservice and the API.

In one embodiment, the cloud foundry may determine the location based on a prior application request for the at least one resource, on a security requirement associated with the at least one resource, on a type of the at least one resource, etc. In one embodiment, the location of the at least one resource may be stored in a database, and the cloud foundry may access the database to retrieve the location.

In one embodiment, the cloud foundry may verify an entitlement of a user associated with the electronic device.

In one embodiment, the microservices may include a REST API a SOAP API, etc.

In one embodiment, the cloud foundry may route the resource to the end user electronic device.

In one embodiment, the end user electronic device may execute the resource.

In one embodiment, the resource may be an application, data, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
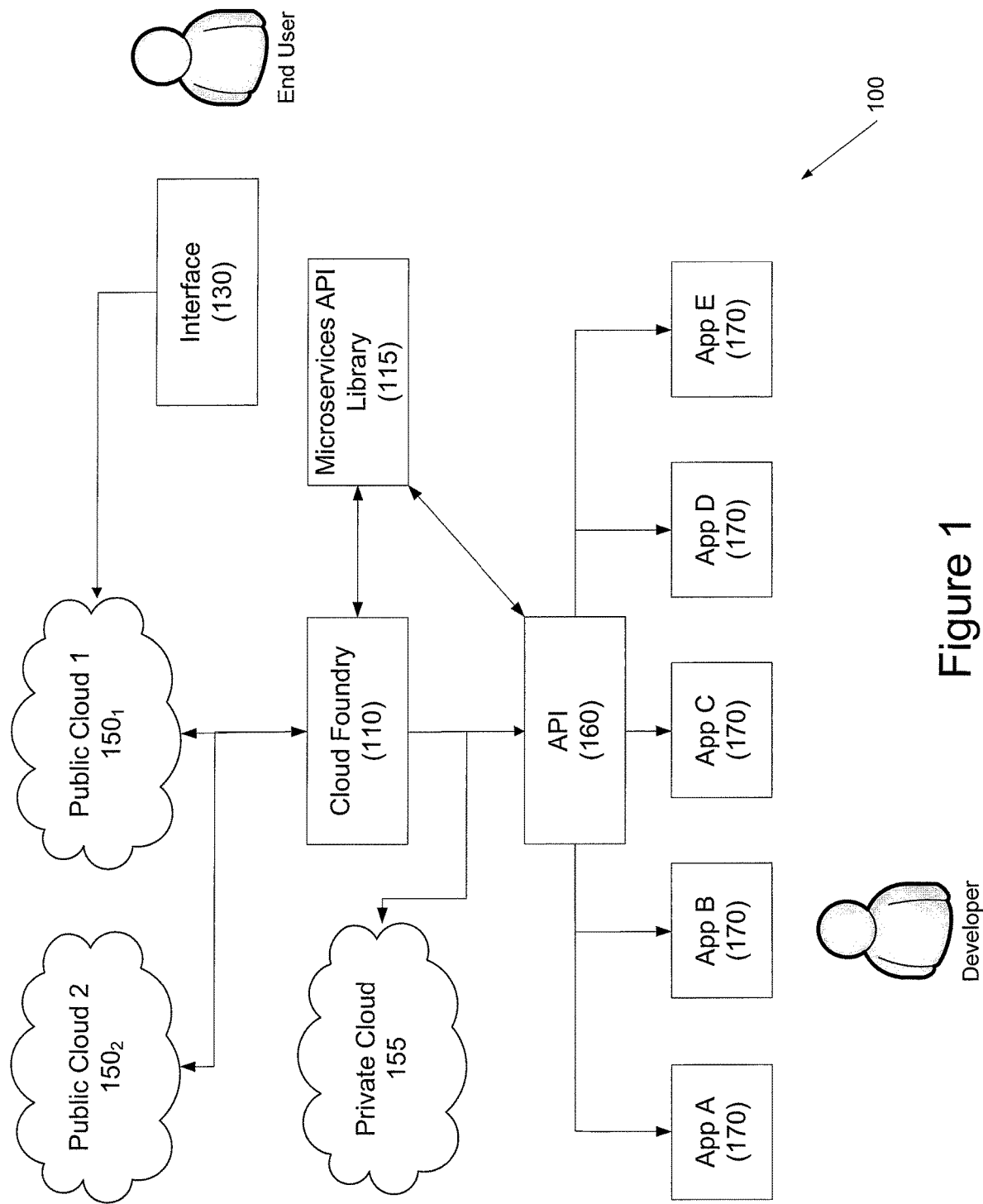
FIG. 1 depicts a system for distributed micro services using private and external networks according to one embodiment.
Figure 2:
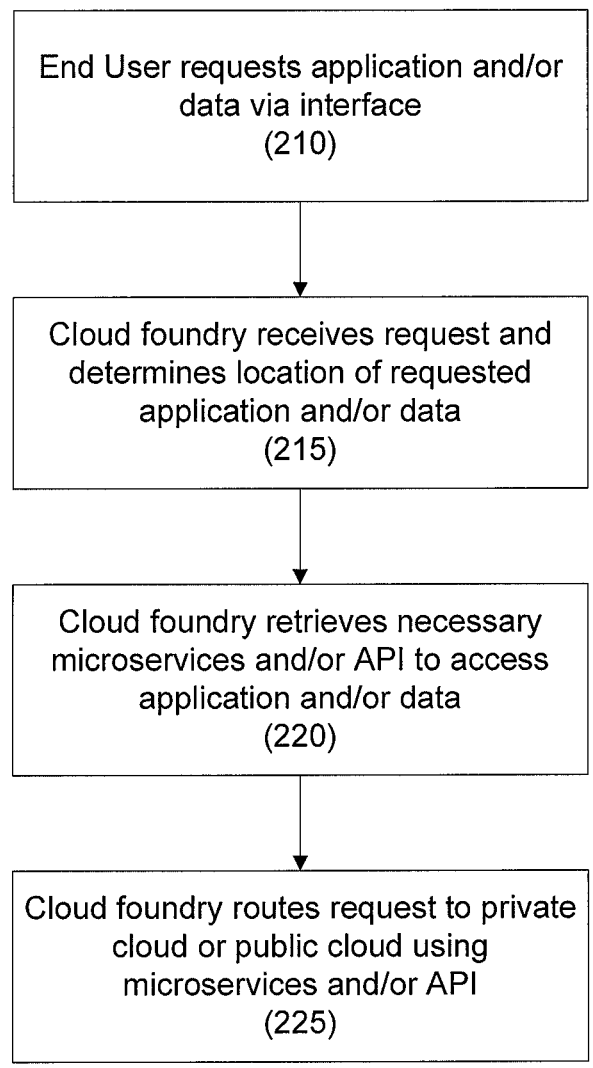
FIG. 2 depicts a method for distributed micro services using private and external networks according to one embodiment.

Several embodiments of the present invention and their advantages may be understood by referring to FIGS. 1-2.

As companies have opted to run their infrastructure in the cloud in order to realize the cost savings associated with cloud computing, security and risk mitigation may be compromised. Embodiments disclosed herein are directed to systems and methods that provide distributed micro services using private and external networks. For example, a cloud computing hybrid may leverage a microservices API library or framework to deploy applications in the hybrid cloud infrastructure.

In one embodiment, the microservices API library may define metadata.

In one embodiment, the disclosure may provide some or all of the following: (1) it may store data privately and in one or more third party clouds (e.g., public clouds); (2), it may provide a three-tier architecture (e.g., web, application, database); (3) it may provide integrated monitoring; (4) it may be a self-service or on-demand system; (4) it may provide "pay as you go" capability; (5) it may provide security.

In one embodiment, the use of microservices APIs may provide some or all of the following benefits: (1) it may be easier to manage, as it may provide a single pattern for load-balancing and failover for some or all applications; (2) the architecture may facilitate horizontal scaling as usage increases; (3) data replication may be reduced or eliminated, thereby reducing cost and complexity; (4) it may be easier to test, deploy, and verify, resulting in improved stability; (5) some or all applications may use a consistent and appropriate level of security; (6) developers may self-service from the microservices API library; and (7) the use of the microservices API library may automatically generate code for multiple languages (e.g., Javascript, Java, Python, Haskell, Swift, C++, etc.). Other features and/or benefits may be realized.

Referring to FIG. 1, a system for distributed micro services using private and public networks is disclosed according to one embodiment. System 100 may include cloud foundry 110. Cloud foundry 110 may provide three levels of cloud computing: (1) infrastructure as a Service ("IaaS"), which generally provides only a base infrastructure, leaving the end user responsible for platform and environment configuration necessary to deploy applications; (2) Software as a Service (SaaS); and (3) Platform as a Service (PaaS), which helps to reduce the development overhead (e.g., environment configuration) by providing a ready-to-use platform. PaaS services may be hosted on top of infrastructure provided by an IaaS).

In embodiments, cloud foundry 110 may provide one or more of the following: (1) an environment to run an application; (2) application life cycle management; (3) self-healing capacity; (4) centralized management of applications; (5) a distributed environment; (6) easy integration; and (7) easy maintenance (e.g., upgrades, etc.).

System 100 may further include microservices API library 115. Microservices API library 115 may provide API resources for developers to access code, including auto-generated code. It may further provide automated documentation and provides a store for users to register APIs.

In one embodiment, microservices may be stored or hosted in by cloud foundry 110 and/or microservices library 115 (e.g., by a server). The microservices may include, for example, REST, SOAP APIs. In one embodiment, one or more of microservices may be hosted privately, or using GAIA.

In one embodiment, the microservices may enable one or more app 170 to communicate with one or more of cloud 150 (e.g. public cloud $150_1$, public cloud $150_2$, etc.) or private cloud 155 (e.g., cloud computing within an organization). For example, if the relevant data for an API is in public cloud $150_1$, the API may point to public cloud $150_1$.

In one embodiment, each of public clouds 150 and private cloud 155 may provide different features and/or benefits.

In one embodiment, the determination of whether to access data and/or microservices in public cloud 150 or in private cloud 155 may be manual; in another embodiment, it may be automatic based on the type of data/microservices desired, a security level associated with the microservices/data, etc. Machine learning may be used as necessary and/or desired.

In one embodiment, if the developer does not have a preference as to where the application or data is hosted, the cloud foundry may spawn the instance based on best cost, best CPU performance, memory performance, the data center that is closest to the users, etc., combinations thereof, etc.

In one embodiment, microservices may be mobilized as needed based on the best match.

System 100 may further include a security component that may be part of cloud foundry 110 and/or applications 170. In one embodiment, the security component may verify the authorization of a user, an account, etc. to access certain applications, data, etc. Both end users and developers may have their credentials, or their account credentials, validated.

One or more applications, or apps, 170 may be provided. Apps 170 may be web applications. Apps 170 may interface with public clouds 150 or private cloud 155 using APIs from microservices API library 120.

Public clouds 150 and/or private cloud 155 may be provided to store public and/or private data. In one embodiment, clouds 150 and/or 155 may be provided in any format, and cloud foundry 110 may interface with any format.

Referring to FIG. 2, a method for an end user use of distributed micro services using private and external networks is disclosed according to one embodiment. In step 210, an end user may request an application and/or data via an interface.

In one embodiment, the interface may be with the cloud, and the request may be passed to the cloud foundry.

In one embodiment, the interface may be provided on a mobile electronic device, a workstation, a tablet computer, a desktop computer, a notebook computer, an Internet of Things appliance, etc.

In step 215, the cloud foundry may receive the request and determine a location of the requested application and/or data.

In one embodiment, the cloud foundry may determine the location of the requested application and/or data from a lookup table. In another embodiment, the cloud foundry may use machine learning to identify the location of the requested application and/or data.

In step 220, the cloud foundry may retrieve any microservices and/or APIs necessary to access the application and/or data. In one embodiment, the cloud foundry may retrieve the microservices from a microservices library. The APIs may be retrieved from cloud foundry 110 and/or microservices API library 115.

In step 225, the cloud foundry may route the request to the cloud or to local computing using the microservices and/or API.

Although several embodiments have been disclosed, it should be recognized that these embodiments are not exclusive to each other.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer.

However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for accessing a resource, comprising:
   a cloud foundry comprising at least one computer processor receiving an application request from an interface provided by an end user electronic device;
   the cloud foundry determining a location of a resource associated with the application request based on a prior application request for the resource and the end user's physical proximity to a data center hosting the resource, wherein the location is selected from a private cloud and a public cloud;
   the cloud foundry determining whether to access the resource based on a security level associated with the resource at the location;
   the cloud foundry retrieving at least one of a micro service and an API necessary to access the resource from the location; and
   the cloud foundry routing the application request to the location using the at least one of the micro service and the API.

2. The method of claim 1, wherein the cloud foundry determines the location based on a type of the resource.

3. The method of claim 1, wherein the location of the resource is stored in a database, and the cloud foundry accesses the database to retrieve the location.

4. The method of claim 1, wherein the at least one of the micro service and the API are stored in a library.

5. The method of claim 1, further comprising:
   the cloud foundry verifying an entitlement of a user associated with the electronic device to access the application or the resource.

6. The method of claim 1, wherein the micro services comprise at least one of a REST API and a SOAP API.

7. The method of claim 1, further comprising:
   the cloud foundry routing the resource to the end user electronic device.

8. The method of claim 1, wherein the resource is one of an application and data.

9. A system for accessing a resource, comprising:
   an end user electronic device;
   a cloud foundry in communication with the end user electronic device;
   a micro services API library hosting a plurality of micro services;
   at least one public cloud hosting at least one public resource; and
   at least one private cloud hosting at least one private resource;
   wherein:
     the cloud foundry receives an application request from an interface provided by the end user electronic device;
     the cloud foundry determines a location of a resource associated with the application request based on a prior application request for the resource and the end user's physical proximity to a data center hosting the resource, wherein the location is selected from the private cloud and the public cloud;
     the cloud foundry determining whether to access the resource based on a security level associated with the resource at the location;
     the cloud foundry retrieving, from the micro services API library, at least one of a micro service and an API necessary to access the resource from the location; and the cloud foundry routing the application request to the location using the at least one of the micro service and the API.

10. The system of claim 9, wherein the cloud foundry determines the location based on a type of the resource.

11. The system of claim 9, further comprising at least one database that stores the location of the resource, and the cloud foundry accesses the database to retrieve the location.

12. The system of claim 9, wherein the cloud foundry verifies an entitlement of a user associated with the electronic device to access the application or the resource.

13. The system of claim 9, wherein the micro services comprise at least one of a REST API and a SOAP API.

14. The system of claim 9, wherein the cloud foundry routes the resource to the end user electronic device.

15. The system of claim 9, wherein the end user electronic device executes the resource.

16. The system of claim 9, wherein the resource is one of an application and data.

* * * * *